United States Patent

[11] 3,624,063

[72] Inventor Donald R. Witt
 Bartlesville, Okla.
[21] Appl. No. 840,836
[22] Filed July 10, 1969
[45] Patented Nov. 30, 1971
[73] Assignee Phillips Petroleum Company

[54] ETHYLENE POLYMERIZATION USING CATALYST OF CONTROLLED PARTICLE SIZE
 5 Claims, No Drawings
[52] U.S. Cl.................................................... 260/93.7,
 260/94.9 B, 260/94.9 D, 260/94.9 P
[51] Int. Cl........................................................ C08f 1/66,
 C08f 3/06
[50] Field of Search........................................... 260/94.9 P,
 94.9 B

[56] References Cited
UNITED STATES PATENTS
3,225,023 12/1965 Hogan et al.................. 260/94.9
3,288,767 11/1966 Hogan et al.................. 260/88.2

Primary Examiner—Joseph L. Schofer
Assistant Examiner—A. Holler
Attorney—Young and Quigg ABSTRACT: A process for producing particle-form olefin polymer in which the size of the silica-supported chromium oxide catalyst is selected to regulate the molecular weight distribution of the polymer.

3,624,063

ETHYLENE POLYMERIZATION USING CATALYST OF CONTROLLED PARTICLE SIZE

This invention pertains to olefin polymerization.

In one of its more specific aspects, this invention pertains to olefin polymers produced by catalytic polymerization of a 1-olefin over a supported catalyst.

Use of supported catalysts for the polymerization of olefins, particularly 1-olefins, and particularly ethylene, is well-known. The polymer can be produced in the form of a solution or in the form of a solid existing as a slurry in a liquid medium. In one method, a chromium oxide-containing catalyst is employed. Depending upon the reaction conditions employed, certain properties of the polymer, such as melt index can be varied.

It has now been discovered that polymer of selected properties can be produced by controlling the particle size of the catalyst employed. According to the method of this invention, there is provided, in the process for the catalytic polymerization of an olefin to produce a polymer in particle-form, said process employing preferably a particulate silica-supported chromium oxide catalyst suspended in an organic diluent at a temperature suitable to produce a particle-form polymer as a slurry, the improvement comprising selecting the particle size of the catalyst employed to control the rheological properties of the polymer produced.

In the practice of the invention the average molecular weight distribution of the polymer product is measured and the average particle size of the catalyst is increased if the average molecular weight distribution decreases and; conversely, decreased if the average molecular weight distribution increases to obtain a polymer having a regulated molecular weight distribution.

Accordingly, it is an object of this invention to provide a method of producing polymers having controllable molecular weight distribution.

It is another object of this invention to minimize polymer rheological deviations in that product produced from a single polymerization.

These and other objects of this invention will become evident from the following discussion.

The process to which the present invention is particularly applicable is that generally described in British Pat. No. 853,414 and is generally known as particle-form polymerization process. In that process, at least one olefin is polymerized at a temperature in the range of about 150° F. to about 230° F. by the catalyst consisting essentially of chromium oxide on supports such as silica, silica-alumina, alumina, zirconia, thoria, at least a portion of the chromium being in the hexavalent state at the initial contact between the olefin and catalyst. The catalyst is maintained in suspension and is contacted with the olefin in an organic medium at pressures sufficient to maintain the medium in the liquid phase. The medium and temperature are such that the polymer produced is insoluble in the medium and is recovered in the form of solid particles.

The product produced by the polymerization consists of a mixture of polymers which mixture exhibits properties approximating an average of those properties possessed by the individual polymers of the mixture. In other words, the total product polymer produced from any polymerization is one in which there are various percentages of the various component polymers, on the basis of which the total polymer exhibits properties which represent the average properties of the polymers contained therein.

The shear response of a polymer is largely a function of its molecular weight distribution, the narrower the distribution, the smaller the change in shear rate with change in applied shear stress. Conversely, the wider the molecular weight distribution, the greater the change in shear rate with change in applied shear stress.

The molecular weight distribution of a polymer is generally expressed as the ratio of its weight average molecular weight, $M_w$, to the number average molecular weight, $M_n$. However, this ratio, $M_w/M_n$ is also proportional to the ratio of its high-load melt index, HLMI, to its regular melt index, MI. Accordingly, then, the shear response and molecular weight distribution of a polymer is reflected in the ratio between its high-load melt index and its regular melt index.

It has now been ascertained that certain of the shear properties of a polymer are related to the particle size or related properties of the catalyst used in the production of the catalyst. This is indicated by the fact that under the conditions of comparatively constant melt index, the high-load melt index varies with the catalyst particle size and properties related thereto. Specifically, it has been found that molecular weight distribution of the composite polymer produced in the polymerization process broadens, as indicated by the ratio of the high-load melt index (HLMI-ASTM D 1,238–57T, Condition F) to melt index (MI-ASTM D 1,238–57T, Condition E), as the particle size of the catalyst increases. While it is known that catalyst particle size affects reaction rates and that certain particle size catalysts are preferentially employed for other reasons, heretofore it has not been known that the molecular weight distribution of the polymer would be affected.

It has been found, for example, that a polymer of relatively narrow molecular weight distribution is obtained when using catalyst particles of 325 mesh or finer. Under the same conditions, a catalyst having a particle size of about 140 mesh or coarser produces a polymer of much broader molecular weight distribution. Catalyst particles of an intermediate size, for example, about 200–300 mesh size, produce a polymer with an intermediate molecular weight distribution. Ordinarily catalyst particles coarser than about 20 mesh are not used. However, catalysts of any particle size, even smaller than 325 mesh, can be used.

In operation, the molecular weight distribution of the polymerization product can be continuously measured in any conventional manner and an appropriate signal can be relayed with a conventional controller to appropriate valves on bins of catalyst having relatively small, intermediate, and relatively large particle size. Thus, to maintain the desired molecular weight distribution level, catalysts of specific particle size, or blends thereof, can be introduced into the reaction zone in a controlled manner.

The following data indicate the general effect of catalyst particle size. In each of the following runs, a commercial catalyst comprising 2 weight percent chromium oxide (calculated as the metal) on MSID silica, Davison P757, available from Davison Chemical Division, W. R. Grace and Company, Industrial Chemicals Dept., Baltimore, Md., was screened to obtain the catalyst sizes shown. In each instance, ethylene was polymerized in isobutane diluent at 230° F. and 550 p.s.i.g., the catalyst having been activated prior to polymerization at 1,600° F. in the conventional manner. Essentially identical runs were made with three ranges of catalyst mesh size. In the runs tabulated in table I, the melt index values have been obtained at substantially the same polymer production rates in terms of pounds of polymer per pound of catalyst. Results were as follows:

TABLE I

| Run No. | Mesh size, U.S. Standard Series | Catalyst properties | | | | Polymer properties | | |
|---|---|---|---|---|---|---|---|---|
| | | Surface area, m.²/g. | Pore volume, cc./g. | Pore diameter, A. | Hexavalent chromium content, percent | Regular melt index, MI | High load melt index, HLMI | HLMI/MI |
| 1 | Finer than 325 | 267 | 1.51 | 226 | 0.75 | 1.02 | 60.8 | 59.6 |
| 2 | 200 to 300 | 267 | 1.54 | 231 | 0.65 | 0.98 | 63.8 | 65.0 |
| 3 | 100 to 140 | 260 | 1.55 | 238 | 0.67 | 1.10 | 86.8 | 79.0 |

These data indicate the operability of the method of the present invention in controlling molecular weight distribution of the polymer by selecting the size of the catalyst particles employed in the reaction. These data further illustrate that as the particle size of the catalyst is increased, the ratio of high-load to regular melt index is increased showing that the molecular weight distribution of the polymer produced is broadened.

The method of this invention has wide applicability in commercial production and can be employed over any selected range of melt indices. It permits establishing a reaction zone into which olefin is continuously introduced and polymer continuously withdrawn, the molecular weight distribution of the polymer product being controlled by varying the particle size of the catalyst introduced into the reactor, wither periodically or continuously with the olefin feed. Inasmuch as the molecular weight distribution of polymer evidences itself in specifically determinable properties such as shear response, the method of this invention provides a means of producing in a single continuous operation or in a series of batch operations, a blend of polymers of individual properties which impart to the total polymer properties not otherwise obtainable.

It will be evident from the above discussion that certain modifications can be made to this invention. However such are considered to be within the scope of the invention.

What is claimed is:

1. A process for producing a particle-form polymer of regulated molecular weight distribution obtained by polymerizing a 1-olefin in a reaction zone in the presence of a supported polymerization catalyst comprising an oxide of chromium and a support of at least one oxide selected from the group consisting of silica, alumina, zirconia and thoria, which comprises determining the average molecular weight distribution of the polymer produced and increasing the average particle size of the catalyst if the molecular weight distribution decreases and decreasing the average particle size of the catalyst if the average molecular weight distribution increases and thereby obtaining a polymer of said 1-olefin having a regulated molecular weight distribution.

2. The process as defined in claim 1 in which the catalyst mesh size is from about 20 to about 500 mesh, U.S. Standard Sieve Series.

3. The process as defined in claim 1 in which the catalyst comprises chromium oxide supported on a silica base.

4. The process as defined in claim 1 in which the catalyst mesh size is from about 100 to about 325 mesh, U.S. Standard Sieve Series.

5. The process as defined in claim 1 in which the polymer has an HLMI/MI ratio within the range of from about 60 to about 80 and a melt index within the range of from about 1.00 to about 1.10.